Nov. 25, 1952     S. L. EPPEL     2,619,178
PRECAUTIONARY CIRCUIT
Filed June 24, 1949     7 Sheets—Sheet 1

INVENTOR
S. L. EPPEL
BY John A. Hall
ATTORNEY

Nov. 25, 1952

S. L. EPPEL 2,619,178

PRECAUTIONARY CIRCUIT

Filed June 24, 1949

INVENTOR
S. L. EPPEL
BY John A. Hall
ATTORNEY

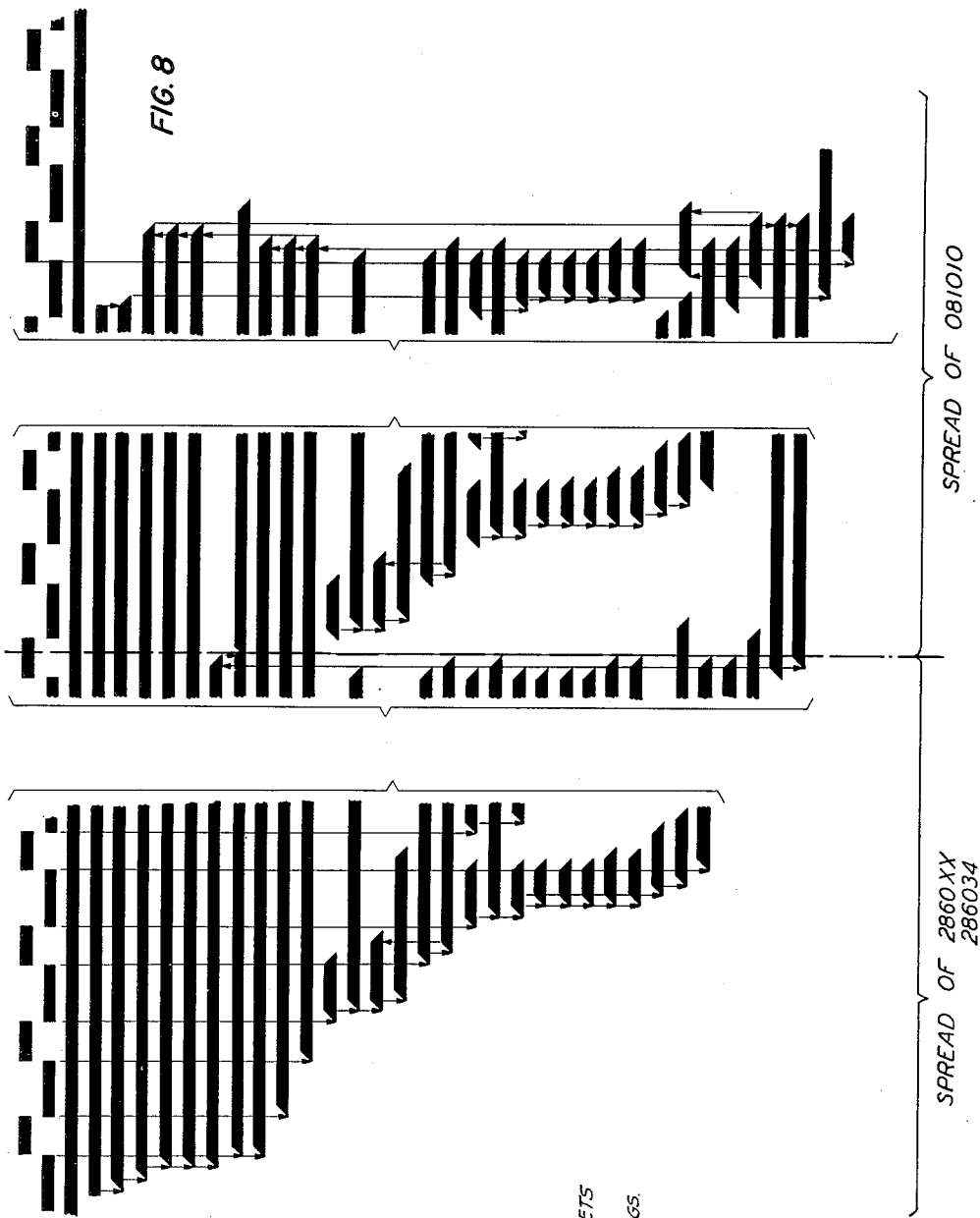

Patented Nov. 25, 1952

2,619,178

UNITED STATES PATENT OFFICE 2,619,178

PRECAUTIONARY CIRCUIT

Simeon L. Eppel, Flushing, N. Y., assignor to Bell Telephone Laboratories, Incorporated, New York, N. Y., a corporation of New York Application June 24, 1949, Serial No. 101,081

2 Claims. (Cl. 164—115)

This invention relates to recording devices and particularly to control means therefor.

The object of the invention is to provide safeguard means to prevent the formation of a record, used in the process of automatic accounting, which might lead to errors, and particularly to insure that the records about to be formed are in satisfactory structural form to properly function in the next processing device in which they will be used.

In its preferred form, the present invention is employed in an automatic accounting system in which charges made against customers for the use of certain facilities are processed through a plurality of steps to the final preparation of customers' bills. As a specific example of such an automatic accounting system, a message accounting system for preparing bills to be presented to subscribers for rendered telephone service is disclosed, at least in part. The process used is to record on a tape items of information pertaining to the individual calls made by the various subscribers over a given period. This tape is then placed in a processing device known as an assembler by which the items of information for each call are collected together so that the output of the assembler contains a record of a large number of groups of items of information, each said group containing complete information for one message. This device consists essentially of a reader for reading off the various items of information found on the input tape, and for then distributing such items of information to the various ones of ten recorders, or perforators, whereby a sorting on the decimal basis is carried out of the trunk numbers over which the various calls were established, and ten output tapes are formed. These ten output tapes are then joined to form a single tape to be used as the input tape for the next step in the process.

In the assembler the record is processed twice, first by the units digit of the trunk number and second by the tens digit of the trunk number.

After the separate items of informaiton for each message are thus assembled, the tape formed by physically or mechanically joining the ten output tapes is used as the input tape in a processing device known as the computer. The computer responds to the quality or value of the various items of information and computes various new items of information therefrom. By way of example, where the items of information include a disconnect time and an answer time, the computer will calculate the elapsed time therefrom, and in some cases also translates this elapsed time into an equivalent number of message units. The computer, like the assembler, also includes a reader and a plurality of recorders or perforators, so that in processing the input tapes from the assembler, ten output tapes are produced which must be physically joined to form a new tape for use as the input tape of the next processing unit.

Said next processing unit is known as a sorter and its function is to sort the various computed items of information in accordance with a customer index number, in this case specifically the telephone subscriber's directory number. If the telephone subscriber's directory number is a four-digit number then four sorts are made, in each case the single input tape being converted into ten output tapes which are physically joined to form a single input tape for the next processing step.

Other processing units are also used for other steps in the complete accounting system, but the point is that in each case a single input tape is converted into a plurality of output tapes which are physically joined to form a new single input tape for another processing unit.

In order to facilitate the physical union of the output tapes it is necessary in the starting of each processing operation to insure that a sufficient number of "splice pattern" codes are perforated in the leading end of each output tape so that when the leading end of one output tape is mechanically spliced to the trailing end of another, there will be a continuous line of perforated codes in the single tape thus formed which will allow the tape to pass through the reader of the next processing device.

The present invention consists of a means for insuring that a sufficient number of splice pattern codes have been perforated in the leading end of every one of the plurality of tapes produced by any one of the above-mentioned and other processing devices. Each such device is, therefore, equipped first, with a means for starting the motors of the various devices, second, with a means for causing the tape ends to be perforated, and third, with a start means for starting the functional operation of the device. The invention includes means for preventing the start key from becoming effective until after the motors have been started and until the tape-ends have been perforated to a predetermined minimal extent less than a complete perforating of the tape-ends in a splice code. It will be understood that if it were possible to start the functional operation of a device before the tape-ends are perforated, at least to a predetermined minimal extent, with the splice pattern the physical union of the output tapes might cause some of the information to become mutilated and, therefore, certain subscriber charges to become garbled or recorded erroneously.

Since the final result of the operation of these devices is a factor in the relations between a public service corporation and its customers, the greatest care is exercised to avoid operations which might lead to erroneous or unjust charges. It is, therefore, important that when an original charge record is placed for a sorting operation in the assembler or in any one of the other processing devices that the start of operations be prevented until it is certain that the splice pattern has been perforated in each of the new tapes about to be produced, at least to a predetermined minimal extent.

The effective operation of the start means, therefore, is made dependent upon the successful and partially complete operation, in the instant device, of the perforators of each processing unit.

The disclosure in the application of R. O. Rippere, Serial No. 101,086, filed June 24, 1949, now Patent No. 2,546,835, dated March 27, 1951, is of the circuits employed in the processing device known as the computer. In the Rippere device there may be as many as nineteen perforators. Since the computer not only classifies the various messages computed but also sorts them on a digital or some other basis, here, as in other devices of the accounting system, there is what is known as a spreading operation by which is meant that a particular item of information destined to be placed on each of the output tapes is caused to be sequentially perforated in each of such tapes. The splice pattern code, for instance, is one which must be placed on each of the output tapes, and hence the spreading operation must take place, it being automatic in that, once started, no other operation of the device can disturb or hinder its completion.

Specifically, in the Rippere device, means is provided for insuring that a minimum number of splice patterns is perforated in each output tape and that all splice-pattern holes are completely punched as a series of such holes. Means are, therefore, provided for making a minimum of three spreads of nine splice patterns in each tape, that is for instance, the first perforator in line will be operated to perforate the splice pattern code nine times in its tape and then the second perforator in line will be automatically operated in the same manner until all of the perforators to be used have automatically perforated this splice pattern nine times on their respective tapes. This spreading operation will be automatically carried through three times to insure a minimum of twenty-seven splice pattern codes on each output tape-end. If the means for starting this automatic operation has been restored, then at the completion of the spreading operation the start key may become effective, when operated thereafter, to start the functional operation of the device.

A feature of the present invention, therefore, is the combination of a record scanner or reader, a plurality of devices for producing records, a manual means for starting an automatic operation for preparing each of the said plurality of devices, a manual start means, and means under control of said first manual means for rendering said manual start means effective.

The present invention is an improvement over the system disclosed in the above-identified patent. In this instance, the arrangements used in the sorter and in the assembler above described are disclosed. In these cases the means for rendering the start key effective, while still depending on the completion of a spreading operation, are more economical of time in that it is not necessary to await the completion of such a large number of perforating operations. Where all nineteen perforators are used in the computer and a minimum of twenty-seven splice codes (or any multiple thereof) are perforated in each tape-end, a simple calculation will show that at least five hundred and thirteen codes must be sequentially perforated before the computer can be started in its functional operation. In the present case this may be cut down to a minimum of twenty. From a practical standpoint and according to standard practice, a fair length of tape-end is generally perforated with splice pattern, but the means is nevertheless provided whereby this may be shortened.

Another feature of the present invention is the temporary use of the start circuit for the purpose of controlling the spread of the splice pattern. The start key must be operated to put the device in its functional operation, and when the spread of the splice pattern is complete, the operation of the start key becomes effective. This places a series of start relays in operation and these, in turn, place the device in operation. In accordance with the present invention the operation of the PTE (perforate tape-end) key also causes the operation of this series of start relays, but these are only for the performance of certain intermediate functions and will release before the start key becomes effective. A feature of the invention, therefore, may be stated to be the use of a manual functional start key for operating a series of start relays, means to render the start key ineffective until another given function has been discharged, and means to operate the said series of start relays on the discharge of said other function.

The drawing consists of seven sheets having eight figures as follows:

Figs. 1 to 6, inclusive, when arranged as indicated in Fig. 7, form a complete circuit diagram illustrating the present invention and in which:

Figure 1:
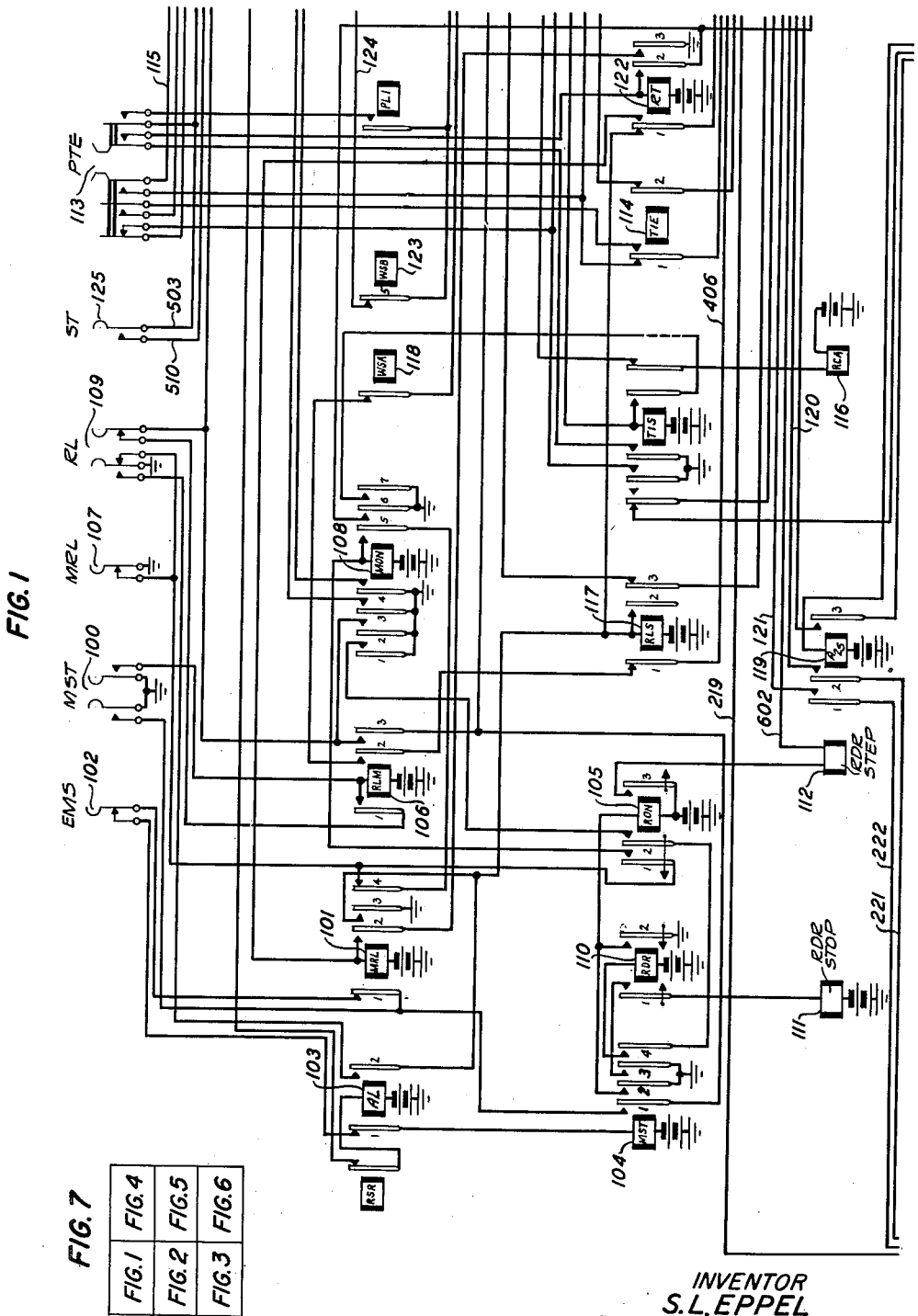
Fig. 1 shows the operating keys and the relays having general control of the operation of the device.

Fig. 7, as mentioned hereinbefore, is a block diagram showing how Figs. 1 to 6 may be placed; and Fig. 8 is a sequence chart showing the sequential operation of the relays in spreading over the tapes in perforators, first, a single occurrence of the skip splice code 2860XX and then a plurality of the splice pattern codes 081010.

It may be noted in connection with Fig. 8 that this sequence chart is divided into three sections. A broken line has been drawn vertically through the second section so that the sequence chart represents from the beginning to this broken line the spread of the skip splice pattern 286034 while the rest of the sequence chart from the broken line on to the end represents the spread of a plurality of the splice pattern code 081010. It may be noted at this time that the SPA relay 500, when operated, causes the reader relays of Fig. 2 to operate in accordance with the code 286034. When speaking of this code in a general sense it is noted as 2860XX. The last two digits are different on each machine and, therefore, serve as an index to identify the particular machine on which any given tape was processed. Let us assume in the present case that the assembler under discussion is numbered 34. Therefore, the leads coming from armatures 7, 8, 9 and 10 of the SPA relay 500 will be permanently cross-connected to cause the E1 relay 200, the E2 relay 201, the F0 relay 202 and the F4 relay 203 to operate to express the digits 3 and 4 in the E and F denominational places.

It will be understood that when an assembler is to be started, the precautionary circuit of the present invention is provided so that at least one skip splice pattern 286034 and one splice pattern code 081010 must be perforated on each of the ten output tapes before the work of the assembler can be commenced. In other words, it is necessary that each of the output tapes have these codes perforated on its leading end before the operation of the start key will become effective. In the following description it will, therefore, be noted that the sequence of operations consists first, of an operation of the MST (motor start) key; second, an operation of the PTE (perforate tape end) key; and third, and after the release of the PTE key, the operation of the ST (start) key. It will further be noted that the PTE key is a locking key and that after it has been operated the device will spread the skip splice pattern 286034 over the ten perforators, perforating this pattern once in each of the output tapes, and will then repeatedly spread the splice pattern 081010 over each of the ten output tapes, continuing this action until the PTE key is released. At the end of the cycle during which the PTE key is released, a relay known as the SPC (splice pattern complete) will be operated and this will close a circuit making it possible for the start key ST to become effective when operated thereafter.

In the operation of the device the MST key 100 is first operated. This closes a circuit from ground through the left-hand contacts of the MST key, armature 1 and back contact of the MRL relay 101, the EMS key 102, the back contact and armature 1 of the AL relay 103 to the winding of the MST relay 104. The MST relay operates the RON (reader off-normal) relay 105 in a circuit from ground through armature 3 and front contact of the MST relay 104. When the circuit has thus gone off-normal the reader step magnet 112 is immediately operated in a circuit from ground, armature 2 and back contact of the RS4 relay 600, armature 1 and back contact of the RS3 relay 601, conductor 602, the winding of the reader step magnet 112, the front contact and armature 3 of the RON relay 105 to battery. The RON relay is one which is fast to operate and slow to release so that immediately the MST key 100 has been operated, the reader step magnet 112 is operated so as to prevent any movement of the tape.

The MST relay 100 also closes through its right-hand contacts a circuit for the operation of the RLM relay 106. A circuit is now closed from ground supplied by the MRL key 107, over the armature 1 and front contact of the RON relay 105 to the winding of the MON relay 108. This relay locks through its front contact and armature 5, armature 4 and back contact of the MRL relay 101 to the ground supplied by the MRL key 107 or alternatively the RL key 109. The MON relay supplies a number of grounds for various operations and will maintain these grounds until release occurs. One circuit closed by the MON relay 108 may be traced through its armature 1 and front contact, the front contact and armature 2 of the RON relay 105, the armature 4 and front contact of the MST relay 104 to the winding of the RDR relay 110. The RDR relay is slow operating so that it delays slightly the operation of the reader stop magnet 111. It will thus be seen that upon the operation of the MST key 100 the reader step magnet 112 operates first and slightly thereafter the reader stop magnet 111 operates. It may be noted at this time that when the device is shut down, the RDR relay, being fast to release and the RON relay being slow to release, the reader stop magnet 111 will become deenergized first and will thus interpose a mechanical tongue before the motor operated by the reader step magnet 112 so as to prevent an unauthorized advance of the reader tape. This feature is disclosed in Patent No. 2,496,150 issued to W. W. Carpenter, on January 31, 1950.

The MST relay 104 also closes a contact to enable the motor which drives the reader. This is not shown here since it is purely conventional in form.

The reader indicated herein by the rectangle 204 periodically closes a number of contacts. There are twenty-eight pins which periodically move up to the face of the tape and where a perforation exists the corresponding pin will pass through the tape and make contact with a cooperating member so as to operate one of the reader relays. Relay means such as the RCA relay 116 are provided for closing the connections between these cooperating members and the reader relays so that the reader relays will not be operated unless the relays represented by the RCA relay 116 are operated. Since the operations to be described hereinafter do not originate with the reader contacts, the RCA relay is left in its released position throughout the following operations. It will be noted particularly that the circuit for this relay extends through the back contact and armature 2 of the ME relay 403, and since this relay will be found to be operated throughout the spreading operation the RCA relay will not operate. Hence, when the SPA relay 500 and the SPB relay 502 are operated, the reader relays will be operated from the contacts of the latter relays and not from the contacts of the reader.

In Fig. 8 the periods during which the reader contacts may be closed are shown in the second line and marked G1, G2, etc. There are also a number of other contacts known as the H3, the H7, the K3 and the K7, and these contacts are closed in the open period of the reader contacts and so illustrated in the top line of said figure. The third line marked "relays previously operated" are such relays as the MST relay 104, the RLM relay 106, the RON relay 105, the MON relay 108 and the RDR relay 110 as well as the reader step magnet 112 and the reader stop magnet 111. The circuit is now in condition for the operation of the PTE key 113. Said key, as indicated in Fig. 8, is directly responsible for the operation of the SP1 relay 400, and the circuit for the latter relay may be traced from ground, armature 2 and front contact of the MON relay 108, back contact and armature 1 of the ST3 relay 401, armature 1 and back contact of the TIE relay 114, contacts of the PTE key 113, conductor 115 to the winding of the SP1 relay 400. The SP1 relay operates and causes the operation of the SP2 relay 402 in an obvious circuit. The SP2 relay, in turn, closes a circuit for the simultaneous operation of the ME relay 403 and the SPA relay 500. The circuit for the ME relay is provided through the front contact and armature 3 of the SP2 relay extending the ground for its own operation to the winding of the ME relay 403. The operation of the SP2 relay 402 extends a ground from its armature 5 and front contact, through armature 1 and back contact of the WS5 relay 501 and thence to the winding of the SPA relay 500.

Following the operation of the SPA relay and as a direct consequence thereof, the following reader relays are operated:

B1-206    C2-208    D4-210    E1-200    F0-202
B7-207    C4-209    D7-211    E2-201    F4-203

The relays of the B, C, D, E and F digits are operated directly by the SPA relay 500. The A2 relay which in this case is used for control purposes only is operated in the following manner. First, a circuit is established from ground, armature 2 and front contact of the MON relay 108, back contact and armature 1 of the ST3 relay 401, armature 1 and back contact of the TIE relay 114, contacts of the PTE key, conductor 115 to operate the SP1 relay 400 as hereinbefore described. When the H7 contact is closed, a circuit is then extended over the conductor 212, back contact and armature 1 of the RS4 relay 600, armature 2 and back contact of the RS3 relay 601, armature 5 and back contact of the LK1 relay 603, conductor 604, armature 4 and back contact of the A2 relay 205, conductor 213, armature 3 and front contact of the SP1 relay 400, conductor 404, front contact and armature 1 of the SPA relay 500, conductor 503, armature 1 and back contact of the ST2 relay 405, conductor 406, armature 1 and back contact of the RLS relay 117, armature 2 and front contact of the RLM relay 106, back contact and armature of the WSA relay 118, to the winding of the ST1 relay 407. The ST1 relay, therefore, operates at the beginning of the first closure of the H7 contact after the SPA relay has operated.

Due to the operation of the ST1 relay 407, a circuit is now established from ground, armature 4 and front contact of the MON relay 108, through the front contact and armature 4 of the ST1 relay 407, the winding of the ST2 relay 405 to a point where the circuit divides into two branches. The first branch of this circuit extends through the back contact and armature 1 of the ST2 relay 405, the front contact and armature 3 of the ST1 relay 407, conductor 213, back contact and armature 4 of the A2 relay 205, conductor 604, back contact and armature 5 of the LK1 relay 603, back contact and armature 2 of the RS3 relay 601, armature 1 and back contact of the RS4 relay 600, conductor 212 to ground supplied by the H7 contact of the reader. The second branch of this circuit extends from the winding of the ST2 relay 405, over conductor 406, armature 1 and back contact of the RLS relay 117, armature 2 and front contact of the RLM relay 106, back contact and armature of the WSA relay 118, through the winding of the ST1 relay 407 to battery. Due to the first branch of this circuit, the ST2 relay 405 is short-circuited at this time, but when at the end of the closure of the H7 contact this ground is removed, the ST2 relay 405 operates in series with the ST1 relay 407, thus maintaining the latter relay operated and bringing into operation the ST2 relay 405. The ST2 relay now opens the first branch of this circuit so that neither of these relays is hereafter affected by the H7 contact of the reader.

On the next closure of the H7 contact a circuit is established from the ground supplied by said contact, over the circuit heretofore traced to the armature 1 of the ST2 relay 405 so that this ground is now extended over the front contact of this relay to the winding of the ST3 relay 401, which becomes energized and locks in a circuit through its own front contact and armature 4, the armature 3 and back contact of the RLS relay 117, the front contact and armature 2 of the ST2 relay 405, the front contact and armature 3 of the MON relay 108. At the same time, a connection is established from ground, armature 5 and front contact of the ST3 relay 401 to the winding of the ST3A relay 408 so that this relay now operates. Now it will be noted that the continued energization of the ST3A relay 408 depends upon the continued energization of the ST3 relay 401 and this, in turn, depends upon the continued energization of the ST2 relay 405 which, in turn, depends upon the continued energization of the ST1 relay 407 and this relay depends on the continued deenergization of the RLS relay 117. It will be noted hereinafter that when the PTE key is released, the SP1 relay 400 will become released, whereupon a circuit will be set up from the H7 contact, through a back contact and armature of the SP1 relay to operate the RLS relay 117 and this, in turn, will allow the start relays to release.

Upon the ending of the closure of the H7 contact and the beginning of the closure of the K1 contact, a circuit is closed from the ground supplied by this K1 contact, over conductor 214, the armature and back contact of the ESP relay 504, the front contact and armature 1 of the ME relay 403, the armature 3 and front contact of the ST3 relay 401, armature 1 and back contact of the APB relay 605, conductor 606 to the winding of the A2 relay 205. With the operation of the A2 relay, the up-check circuit of the reading relays will be closed and the LK1 relay 603 will be operated. A circuit may be traced from the H5 contact in the reader, over conductor 215, the armature 1 and front contact of the RCD relay 607, conductor 608, front contact and armature 3 of the A2 relay 205, back contact and armature 2 of the A1 relay 216 to the winding of the LK1 relay 603. This relay now locks in a circuit from conductor 608 through its armature 4 and front contact, armature 1 and back contact of the RS2 relay 609, back contact and armature 3 of the RS1 relay 610, conductor 611, front contact and armature 7 of the ST3 relay 401.

A circuit is also closed from the G1 or G2 contact over conductor 217, the armature 3 and back contact of the LK2 relay 612, conductor 613, the armature 1 and back contact of the A0 relay 218, the front contact and armature 1 of the A2 relay 205, the back contact and armature 3 of the A1 relay 216, the armature 3 and front contact of the B1 relay 206, the armature 3 and front contact of the B7 relay 207, conductor 219, the armature 3 and front contact of the ME relay 403, conductor 409, armature 1 and back contact of the APD relay 614 to the winding of the APA relay 615, whereupon the latter relay responds. Thus the A2 relay which operated upon the beginning of the closure of the K1 contact of the reader causes the operation of the LK1 and the APA relays within that part of the reader cycle.

As a result of the operation of the APA relay 615, the S0B relay 616 will be operated. A circuit for this relay may be traced from ground, armature 3 and front contact of the LK1 relay 603, thence through a chain circuit including an armature and back contact of each of the relays S9B through S1B, and thence through the winding of the S0B relay 616, the front contact and armature 2 of the APA relay 615, thence through a chain circuit including an armature and back contact of each of the relays S1A to S9A, to the front contact and an armature 1 of the APA relay 615 and thence to battery through an undesignated relay. The S0B relay operates in this circuit and locks through its front contact and armature 2 to battery independent of the contacts of the APA relay 615.

The A2 relay 205, having performed its function of causing the operation of the LK1 relay 603 and the APA relay 615, is allowed to release at the end of the period during which the contact K2 is closed. At the same time the contact K7 is closed so that a circuit is established therefrom over conductor 220, armature 3 and front contact of the APA relay 615 to the windings of the APB relay 605 and the APC relay 617 in parallel, and these relays become operated. As a result of the operation of the APC relay a circuit is established from ground, armature 1 and front contact of the LK1 relay 603, front contact and armature 1 of the S0B relay 616, front contact and armature 2 of the APB relay 605, armature 2 and front contact of the APC relay 617, to the winding of the APD relay 614 so that this relay now becomes operated and locks over its front contact and armature 3, the resistance 620, front contact and armature 1 of the LK1 relay 603 to ground.

As a result of the operation of the APD relay 614 the APA relay 615 is released.

The A2S relay 119 is now operated from ground on contact K1, conductor 214, the back contact and armature of the ESP relay 504, the front contact and armature 1 of the ME relay 403, armature 3 and front contact of the ST3 relay 401 (the circuit for the operation of the A2 relay 205), through the armature 1 and front contact of the APB relay 605 to the winding of the A2S relay 119. As a result of the operation of the A2S relay 119 a circuit is now established from ground on contact H2, armature 3 and front contact of the A2S relay 119, back contact and armature of the WS4 relay 505, thence through a chain circuit including a back contact and armature of each of the relays S9B through S1B to the armature 4 and front contact of the S0B relay 616, and thence to the winding of the S1A relay 618. The S1A relay locks from ground through armature 3 and front contact of the LK1 relay 603, thence through a chain circuit including a back contact and armature of each of the relays S9B through S1B, the resistance 619 to armature 2 and front contact of the S1A relay 618.

As a result of the operation of the A2S relay the cut-in relays for the number 0 perforator of the assembler are now operated in a circuit from the contact G1 or the contact G2, over conductor 217, armature 3 and back contact of the LK2 relay 612, conductor 613, armature 1 and back contact of the A0 relay 218, conductor 221, armature 2 and front contact of the A2S relay 119, conductor 120, back contact and armature 1 of the WS3 relay 506, conductor 507, and thence through a chain circuit including an armature and back contact of each of the relays S9B through S1B, armature 3 and front contact of the S0B relay 616 to the winding of the PA0 relay 300 to battery, thus causing the operation of this relay. On the sequence chart this relay is noted as PA-, PB-, PC- indicating that the relays PA0, PB0 and PC0 are operated together since they have to close a large plurality of circuits (twenty-eight for each of the twenty-eight punch magnets and several other auxiliary circuits).

A circuit is now closed from the H5 contact, conductor 215, through the armature 2 and front contact of the RCD relay 607, conductor 621, the No. 2 right-hand armature and front contact of the PA0 relay 300, the winding of the PD0 relay 301 to battery so that this relay now becomes operated for a purpose which will shortly appear.

Figure 2:
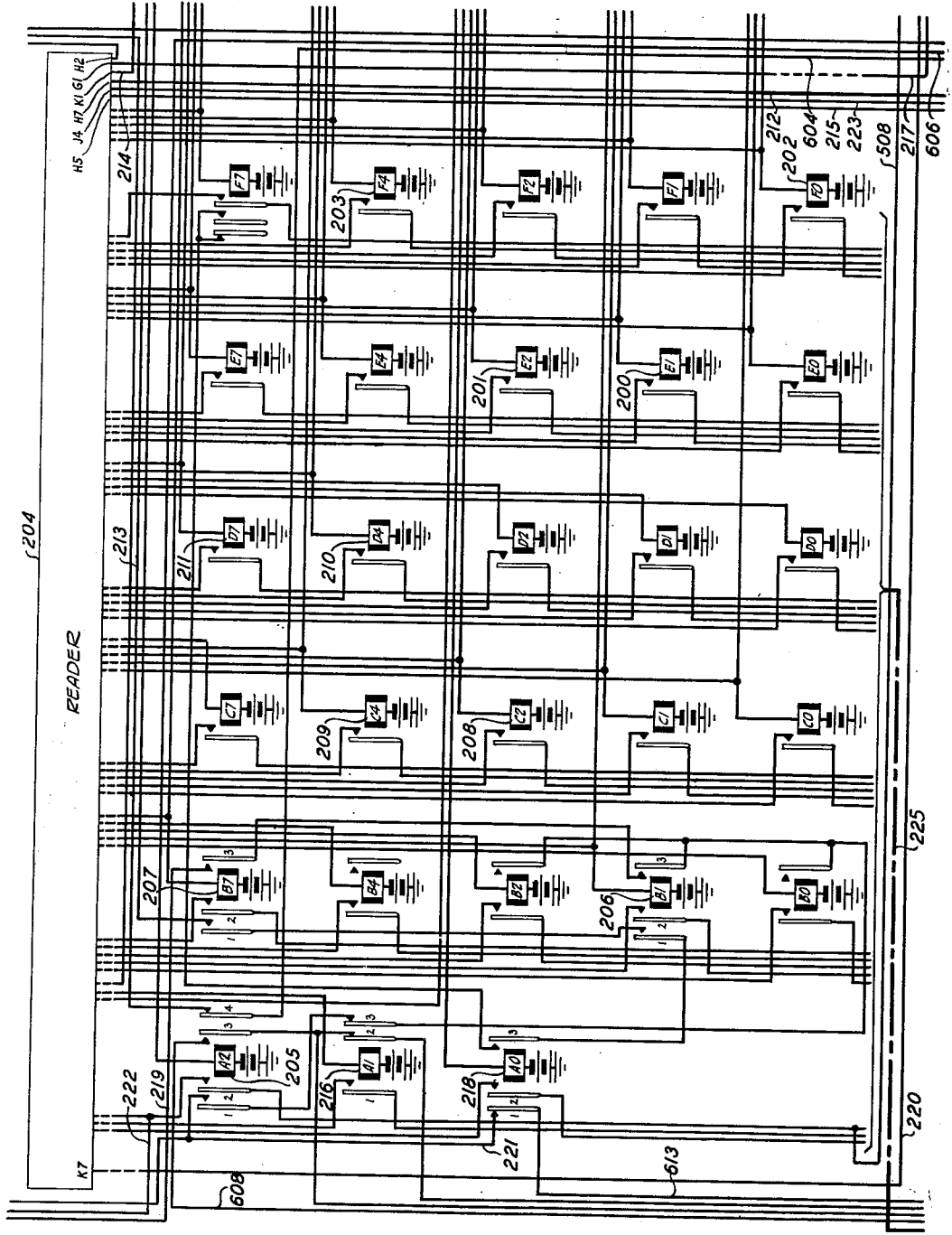
Fig. 2 shows the reader relays the windings of which extend to an indicated reader.
Figure 3:
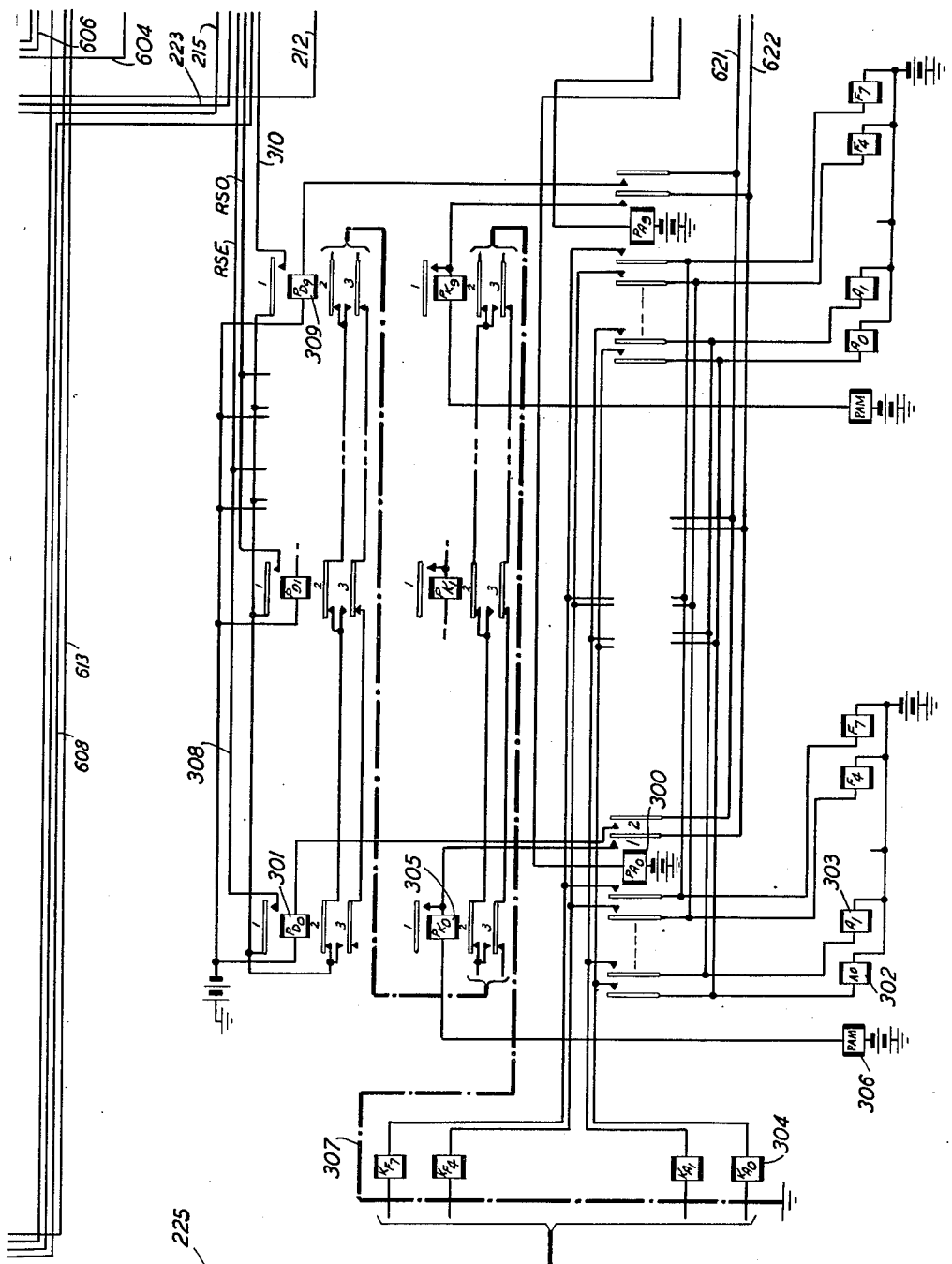
Fig. 3 shows the means for connecting the various perforators to the circuit leading from the reader relays.
Figure 4:
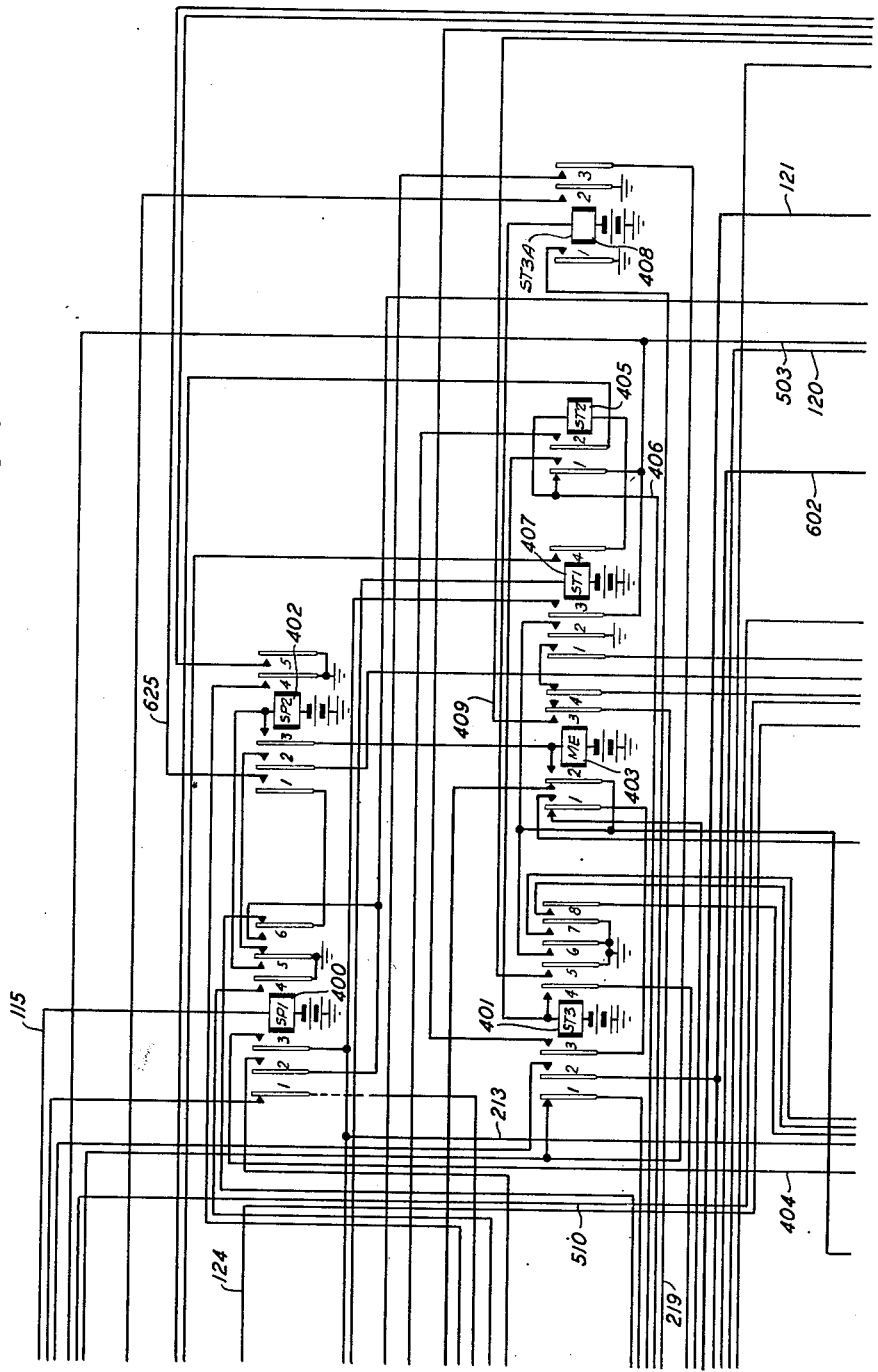
Fig. 4 shows the start relays.
Figure 5:
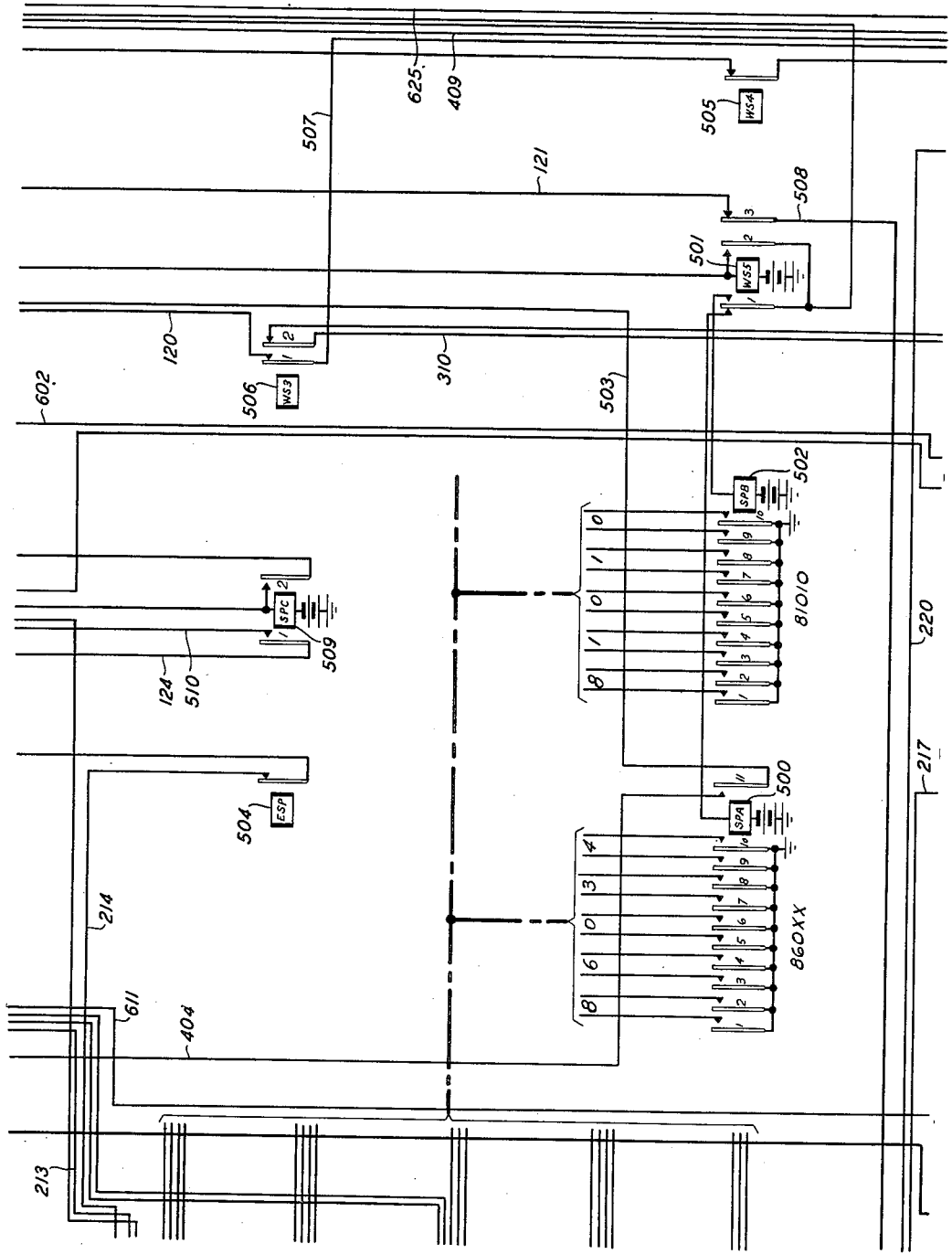
Fig. 5 shows the splice pattern relays for operating the reader relays in accordance with given patterns in order to spread these particular patterns over the leading ends of the tapes in various perforators.
Figure 6:
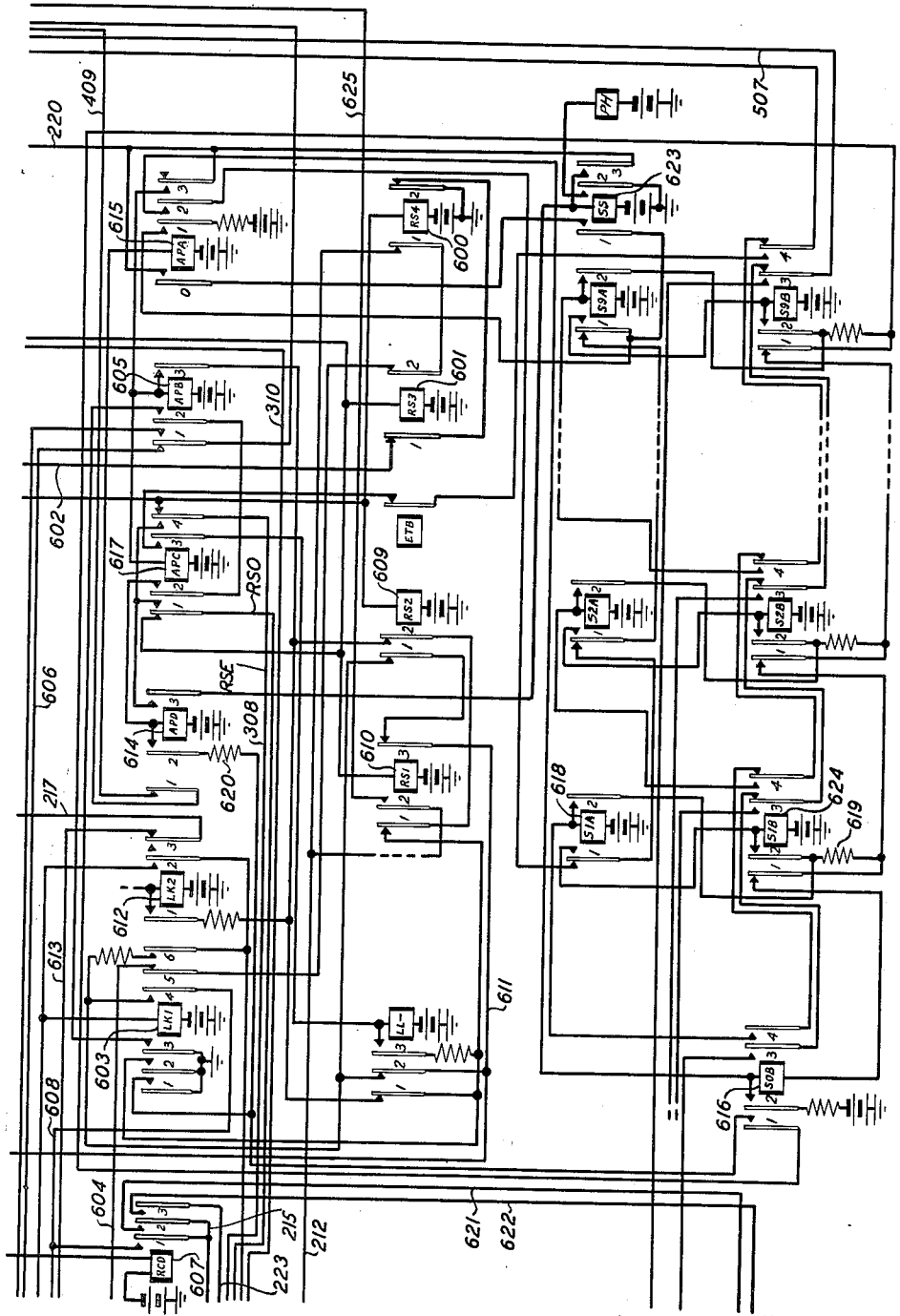
Fig. 6 shows the means for controlling the sequential operation of the perforators.

The punch magnets such as the A0 magnet 302, the A1 magnet 303, etc., are now operated in accordance with the operation of the reader relays in Fig. 2, that is, each of the magnets corresponding to the B, C, D, E and F digits is operated directly through the contacts of the operated B, C, D, E and F relays from the corresponding reader contacts when they are closed. In the case of the A2 relay, however, a circuit is completed by the A2S relay instead of the A2 relay. This circuit may be traced from the reader contact leading to the front contact and armature 2 of the A2 relay 205 but extending over conductor 222, armature 1 and front contact of the A2S relay 119, conductor 121, the back contact and armature 3 of the WS5 relay 501, conductor 508 to the conductor leading from armature 2 of the A2 relay 205 and extending through the group conductor 225 through a relay KA2 (similar to the KA0 relay 304), a front contact and armature of the PA0 relay 300 to the A2 punch magnet (not shown) to battery. Thus, the punch magnets are operated in order to punch in the tape of the number 0 perforator the code 286034.

There is a relay such as the KA0 relay 304 in series with the A0 punch magnet 302 so that one of these K-- relays is operated with each of the punch magnets which is operated. These K-- relays control a check circuit which is here indicated merely as a broken line 307 passing by these relays and then passing through a one and one only circuit controlled by the PK0 to PK9 relays, thence through a one and one only circuit passing through the PD0 to PD9 relays, through the armature 3 and front contact of the PA0 relay 300, conductor 308, armature 4 and front contact of the APC relay 617, the front contact and armature 3 of the APD relay 614, the winding of the SS relay 623 to battery. This is a conventional check circuit to prove that the relays and magnets have operated in the proper pattern. The check circuit 307, as it passes through the armatures and contacts of the K— — relays, will be closed through when and only when two out of five of the KB— relays are operated, two out of five of the KC— relays are operated, etc. The K— — relays are common to the punch magnets of the ten perforators and hence may be used to close this check circuit rather than running the check circuit through the contacts of the PA— relays to the punch magnets themselves.

As another result of the operation of the PA0 relay 300 a circuit will be established from the J4 J1 contacts in the reader over conductor 223, the armature 3 and front contact of the RCD relay 607, conductor 622, the right armature 1 and front contact of the PA0 relay 300, through the winding of the PK0 relay 305 and the winding of the PAM (perforator advance) magnet 306 to battery so that as the code is punched in the tape of the number 0 perforator, the perforator advance magnet PAM will operate to allow the tape therein to advance in proper order. The SS relay 623 is now operated over the circuit just described to establish a circuit for the operation of the S1B relay 624. This relay operates upon the next closure of the K7 contact in the reader. This circuit may be traced from the contacts K7, over the conductor 220, the front contact and number 0 armature of the APA relay 615, front contact and armature 1 of the SS relay 623, back contact and armature 1 of each of the relays S9A to S2A, inclusive, through armature 1 and front contact of the S1A relay 618, to the winding of the S1B relay 624. The S1B relay now locks over the resistance 619 and thence through a chain circuit including a back contact and armature 1 of each of the relays 62B to 69B, inclusive, and thence through the front contact and armature 3 of the LK1 relay 603 to ground.

At the time that the K7 contacts close to cause the operation of the S1B relay 624, the reader contacts and certain other common contacts noted in the second line of the sequence chart opened, causing the simultaneous release of the A2S relay 119, the PA0 relay 300, the PD0 relay 301, the K— — relays such as the KA0 relay 304 and the punch magnets. As a result of the release of the PA0 relay 300, the PK0 relay and the perforator advance magnet 306 are prepared for release. Actually they are held in a locking circuit indicated by the locking contacts of the PK0 relay 305, but for the present purposes may be considered as being released at this time since this is the ultimate normal action.

As a result of the operation of the S1B relay 624, the S0B relay 616 is released. The SS relay 623 is held locked through its front contact and armature 3 to the H3 contact and hence does not release until this H3 contact opens.

This completes the first cycle of the spreading operation and leaves the circuits in such a condition that upon the next closure of the reader contacts, the A2S relay 119 will operate and as a result thereof will cause the other relays depending upon it to operate in the manner just described. The sequence of operation, therefore, from the second operation of the A2S relay and the PA1 relay as shown in the sequence chart, Fig. 8, is broken off in this showing since it is a repetition of the operations just described. In this manner the code 286034 will be punched sequentially in each of the tapes of the number 0 to number 9 perforators, inclusive. The difference in the end of the last cycle is shown in the first part of the second section of the sequence chart, and arises particularly from the fact that the check circuit closed by the PD9 relay 309, instead of extending either through the armature 1 or the armature 4 of the APC relay to cause the operation of the SS relay will, in this case, be extended over conductor 310, thence through armature 2 and back contact of the WS3 relay 506 to operate the RS3 relay 601 and the RS1 relay 610 in parallel.

Upon the next closure of the H7 contact, a circuit is closed from the ground supplied thereby over conductor 212, armature 2 and the front contact of the RS1 relay 610, conductor 625, front contact and armature 1 of the SP2 relay 402, armature 6 and front contact of the SP1 relay 400 to the winding of the WS5 relay 501. As a result of the operation of the WS5 relay the SPA relay 500 is released and the SPB relay 502 is operated in substitution therefor so that now the reading relays of Fig. 2 are changed in their pattern of operation from the skip splice code 286034 to the regular splice pattern 081010.

Thereafter and at the beginning of the next closure of the K1 contact the A2 relay 205 will be operated as hereinbefore described and will start the next spreading operation. This will proceed in the manner described with the exception that now since the SPB relay is operated instead of the SPA relay, the splice pattern code 081010 will be successively and repeatedly perforated in each of the tapes of the number 0 to number 9 perforators, inclusive. This operation will automatically continue so long as the PTE key 113 remains in its operated position.

When the PTE key is restored, the circuit for the SP1 relay over conductor 115 is opened and said relay releases. The SP2 relay 402, however, remains locked under control of the ST1 relay 407 and the ST3 relay 401. The fact that the SP1 relay releases and the SP2 relay remains operated closes a circuit from ground, armature 5 and back contact of the SP1 relay 400, the front contact and armature 2 of the SP2 relay 402 to the winding of the SPC relay 509 which thereupon operates and locks over its armature 2 and front contact, the front contact and armature 6 of the MON relay 108. The operation of the SPC relay conditions the start key 125 so that after the spreading operation has been completed the start key 125 may become effective. This will be described shortly.

After the release of the PTE key and at the completion of the spreading operation taking place at that time, the RS1 relay 610 will be operated as hereinbefore described through the operation of the PD9 relay 309. Therefore, at the next closure of the H7 contact a ground will be extended over conductor 212, armature 2 and front contact of the RS1 relay 610, conductor 625, the front contact and armature 1 of the SP2 relay 402, armature 6 and back contact of the SP1 relay 400, armature 1 and back contact of the RT relay 122 to the winding of the RLS relay 117. The RLS relay 117, at its armature 3 and back contact, opens the circuit for locking the ST3 relay 401 and this, in turn, causes the release of the ST2 relay 405 and the ST1 relay 407. The ST1 relay, in releasing, releases the ME relay 403, the RCD relay 607 and the SP2 relay 402. The SP2 relay, in releasing, releases the WS5 relay 501 and the SPB relay 502 so that the circuit for spreading the splice pattern is now completely restored. At the end of the H7 contact closure the RLS relay 117 releases and the circuit is entirely restored except that the SPC relay 509 and the RLM relay 106 are still locked.

Thereafter when the ST key 125 is closed, a circuit is traced, upon the next closure of the H7 contact after the RLS relay has been released, over conductor 212, back contact and armature 1 of the RS4 relay 600, armature 2 and back contact of the RS3 relay 601, armature 5 and back contact of the LK1 relay 603, conductor 604, armature 4 and back contact of the A2 relay 205, conductor 213, back contact of the WSB relay 123, conductor 124, armature 1 and front contact of the SPC relay 509, conductor 510, the ST key 125, conductor 503, armature 1 and back contact of the ST2 relay 405, conductor 406, armature 1 and back contact of the RLS relay 117, armature 2 and front contact of the RLM relay 106, back contact of the WSA relay 118 and thence through the winding of the ST1 relay 407 to battery. The start relay is, therefore, energized by the start key 125 so that from now on the assembler may function through its regular operations. It may be noted that while the ST1, ST2 and ST3 relays were automatically operated by the PTE key during the spreading operations for perforating in each of the ten output tapes the skip splice pattern 286034 and thereafter a plurality of splice pattern codes 081010, these relays were nevertheless released and restored to normal through the release of the PTE key. It may further be noted that the last circuit traced for the operation of the ST1 relay depends entirely on the closure of the circuit through the armature 1 and front contact of the SPC relay 509 so that an operator of the assembler cannot neglect to prepare the leading ends of the ten output tapes by operating the start key since the start key is totally ineffective until after the operations herein described have been performed.

It may be noted that in other cases the skip splice pattern 286034 is not used in the manner hereinabove described. In such cases exactly the same sort of operations as above described will take place except that after the operation of the PTE key and its release, a minimum of two splice pattern codes 081010 will be spread on the tapes being prepared by the perforators. It will be apparent that this involves no other change than to operate the SPB relay 502 in the first instance rather than the SPA relay 500.

What is claimed is:

1. In a device for processing coded items of information, perforated in an incoming tape by sorting, translating, computing or otherwise rearranging said coded items of information, on a plurality of outgoing tapes, a plurality of perforators for producing a like number of outgoing tapes, a start key for starting said device into functional operation, a splice pattern complete relay for rendering said start key effective, a set of start relays responsive to said start key when rendered effective by said relay, a perforated tape-end key for operating said start relays, means controlled by said key when operated for determining the code to be perforated on said outgoing tapes by said perforators, a sequence chain of relays equal in number and corresponding to said perforators, means controlled by said key for sequentially connecting each said perforator to said code determining means, means controlled by said relay chain upon the operation of the first relay thereof for removing the control of said key therefrom and upon the operation of the last relay thereof for restoring the control of said key thereover, whereby the sequential operation of said chain relays and the sequential perforation of a single determined code in each said outgoing tape is automatically completed once regardless of the condition of said key, means responsive to the restoration of said key at the end of an automatic operation of said chain relays which is less than the total number of holes to be punched for operating said relay, whereby the operation of said start key will be effective thereafter to control the operation of the device in producing other perforations on said output tapes.

2. A device for processing coded items of information, perforated in an incoming tape by sorting, translating, computing or otherwise rearranging said items, on a plurality of outgoing tapes, comprising a reader for reading said items from said incoming tape, a plurality of perforators for perforating in each said outgoing tape coded items of information derived from the items read from said incoming tape, means for spreading by sequential operation of said plurality of perforators a first code on each said outgoing tape, said spreading means including other means for spreading a second code immediately following said first code, the perforations constituting said second code being utilized to physically splice said outgoing tapes to form a continuous tape for use as an incoming tape in the same or other processing device, a normally ineffective start key, a start relay means for preparing certain circuits of said device, a tape-end preparation key operative to complete the circuit of said start relay means, means under the control of said operated tape-end preparation key for operating said spreading means and each one of said plurality of perforators in succession to spread said first code and thereafter to spread said second code repeatedly so long as said tape-end preparation key remains operated, and means responsive to the completion of all used spreading cycles taken in any selective combination, including one cycle and the total of cycles and the restoration of said tape-end preparation key for rendering said start relay means responsive to said start key.

SIMEON L. EPPEL.

REFERENCES CITED

The following references are of record in the file of this patent:

UNITED STATES PATENTS

| Number | Name | Date |
| --- | --- | --- |
| 2,112,951 | Carpenter | Apr. 5, 1938 |
| 2,376,111 | Bacon | May 15, 1945 |
| 2,386,763 | Williams | Oct. 16, 1945 |